United States Patent
Murasugi et al.

(10) Patent No.: US 6,614,594 B2
(45) Date of Patent: Sep. 2, 2003

(54) PROJECTION PANEL ASSEMBLY, PROJECTION APPARATUS, AND PRODUCTION METHOD THEREOF

(75) Inventors: Hiroshi Murasugi, Kanagawa (JP); Takaaki Iwaki, Tokyo (JP); Satoru Murata, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/906,363

(22) Filed: Jul. 16, 2001

(65) Prior Publication Data

US 2002/0005985 A1 Jan. 17, 2002

(30) Foreign Application Priority Data

Jul. 17, 2000 (JP) ........................ P2000-221074

(51) Int. Cl.⁷ ............................ G03B 21/56; H04N 5/64
(52) U.S. Cl. ...................... 359/450; 359/449; 359/460; 348/789; 348/836
(58) Field of Search ................. 359/443, 449, 359/450, 460; 348/789, 836

(56) References Cited

U.S. PATENT DOCUMENTS

| | | | |
|---|---|---|---|
| 3,580,661 A | * 5/1971 | Cooper, Jr. | 359/457 |
| 4,136,935 A | * 1/1979 | Cook et al. | 352/104 |
| 4,921,330 A | 5/1990 | Takahashi et al. | |
| 5,548,350 A | 8/1996 | Yamada et al. | |
| 5,604,632 A | * 2/1997 | Sawai | 359/443 |
| 5,676,441 A | * 10/1997 | Takahashi | 353/94 |
| 5,818,639 A | * 10/1998 | Furuya | 359/455 |
| 5,910,826 A | * 6/1999 | Aoki et al. | 348/781 |
| 6,268,960 B1 | * 7/2001 | Hirota et al. | 359/460 |
| 6,480,243 B2 | * 11/2002 | Yamamoto | 348/836 |

FOREIGN PATENT DOCUMENTS

| | | | |
|---|---|---|---|
| EP | 0616246 | 9/1994 | G03B/21/62 |
| JP | 160982 | 6/1994 | G03B/21/62 |
| JP | 015080 | 1/1999 | G03B/21/62 |

* cited by examiner

Primary Examiner—Russell Adams
Assistant Examiner—Magda Cruz
(74) Attorney, Agent, or Firm—Jay H. Maioli

(57) ABSTRACT

A projection panel assembly is mounted on a casing for holding a screen so as to mount a front panel on the viewing side of the screen. The projection panel assembly includes a fixing portion for directly fixing the front panel and a supporting portion for movably supporting the front panel via the fixing portion. This makes it possible to absorb any distortion of the front panel due to thermal expansion and contraction.

8 Claims, 8 Drawing Sheets

PROJECTION PANEL ASSEMBLY, PROJECTION APPARATUS, AND PRODUCTION METHOD THEREOF

BACKGROUND OF THE INVENTION

1. Field of the Invention

The present invention relates to a projection panel assembly used for, for example, a front panel placed on the front side of a projection apparatus, to a projection apparatus having the projection panel assembly, and to a production method of the projection apparatus.

2. Description of the Related Art

Projection apparatuses are known in which an image or the like is projected onto a relatively large screen from its rear side.

FIGS. 8 and 9 are a front view and a sectional view, respectively, of such a projection apparatus 100.

Referring to FIG. 9, the projection apparatus 100 includes an optical unit 140 for projecting an image or the like onto a screen 120, and a reflection plate 150 for reflecting the image or the like projected from the optical unit 140 toward a front panel 130. The image or the like reflected from the reflection plate 150 is projected onto the screen 120, and an user views the image via the front panel 130.

The screen 120 and the front panel 130 are held by a bezel body 160 serving as a casing shown in FIG. 8.

FIG. 10 is an end view showing the relationship between the screen 120 and the front panel 130 disposed on the front side thereof. Referring to FIG. 10, the screen 120 is composed of, for example, two members, and is fixed to the bezel body 160 by a fixture 2.

The front panel 130 is placed on the front side of the screen 120 with a fixed space therebetween. The front panel 130 serves to improve the contrast when illuminated by external light and to protect the screen 120, and is fixed to the bezel body 160 with an adhesive tape 5.

The front panel 130 and the bezel body 160 expand or contract due to the heat generated by the projection apparatus 100, changes in outside air temperature, or changes in humidity. The coefficients of expansion or contraction differ between the front panel 130 and the bezel body 160.

For this reason, the front panel 130 may be distorted or the adhesive tape 5 may be separated due to the difference in coefficient of expansion or contraction. This results in defects of the projection apparatus 100 itself.

SUMMARY OF THE INVENTION

In view of the above problems, an object of the present invention is to provide a projection panel assembly in which the distortion or the like of a front panel due to expansion or contraction can be absorbed, a projection apparatus having the projection panel assembly, and a production method of the projection apparatus.

In order to achieve the above object, according to an aspect of the present invention, there is provided a projection panel assembly mounted on a casing for holding a screen so as to mount a front panel on the front side of the screen, the projection panel assembly including a fixing portion for directly fixing the front panel, and a supporting portion for movably supporting the front panel via the fixing portion.

Since the projection panel assembly includes the fixing portion for directly fixing the front panel and the supporting portion for movably supporting the front panel via the fixing portion, even when the front panel or the casing deforms due to expansion or contraction, the deformation can be absorbed by the movement of the fixing portion in connection with the supporting portion.

Preferably, the supporting portion is fixed to the casing.

Since the supporting portion is fixed to the casing, the fixing portion and the front panel supported by the supporting portion are fixed to the casing via the supporting portion.

Preferably, the supporting portion is disposed so as to fix the screen to the casing.

Since the screen is fixed to the casing by the supporting portion, the fixing portion and the screen can be fixed to the casing by the single supporting portion.

According to another aspect of the present invention, there is provided a projection apparatus having a projection panel assembly mounted on a casing for holding a screen so as to mount a front panel on the front side of the screen, wherein the projection panel assembly includes a fixing portion for directly fixing the front panel, and a supporting portion for movably supporting the front panel via the fixing portion.

Since the projection apparatus includes the fixing portion for directly fixing the front panel and the supporting portion for movably supporting the front panel via the fixing portion, even when the front panel or the casing deforms due to expansion or contraction, the deformation can be absorbed by the movement of the fixing portion in connection with the supporting portion.

Preferably, the front panel has, on the inner light-source side thereof, a contact portion with which the fixing portion of the projection panel assembly is contacted, and a front panel center portion adjacent to the contact portion. The contact portion has no antireflective portion.

In this case, when the fixing portion of the projection panel assembly is fixed to the front panel, a sufficient adhesion can be ensured between the contact portion of the front panel and the fixing portion, and the fixing portion can be fixed firmly. This avoids problems, such as a weak fixing force, and improves the reliability of the projection apparatus. Furthermore, by forming the antireflective portion in the front panel center portion, the contrast of an image or the like on the screen is improved.

Preferably, a printed shading portion is formed so as to include at least the contact portion of the front panel.

In this case, the fixing state of the contact portion of the front panel to the fixing portion is prevented by the printed shading portion from being viewed from the outside. Therefore, the outward appearance is good, and this does not cause the user of the projection apparatus to feel unpleasant.

Preferably, an antireflective portion is formed on the entire viewing-side surface of the front panel.

Since the antireflective portion is formed on the entire viewing-side surface of the front panel, antireflective portions are formed on both the viewing-side and the light-source-side surfaces of the front panel center portion. This improves the contrast when illuminated by external light, compared with a case in which an antireflective portion is formed only on the light-source-side or viewing-side surface.

Preferably, the antireflective portion is formed of a film coated with an AR solvent.

In this case, in particular, the antireflective film can be precisely and easily formed on the portions of the front panel other than the contact portion.

According to a further aspect of the present invention, there is provided a production method of a projection apparatus having a projection panel assembly mounted on a casing for holding a screen so as to mount a front panel on the outer viewing side of the screen, the production method including the steps of forming a projection panel assembly having a fixing portion for fixing the front panel, and a supporting portion for movably supporting the front panel via the fixing portion, forming a contact portion for contacting the fixing portion therewith on the inner light-source side of the front panel, forming a printed shading portion including at least the contact portion, forming an antireflective portion on the light-source side surface of the front panel except for the contact portion, and fixing the fixing portion to the contact portion so as to mount the front panel in the projection panel assembly.

In this case, since the supporting portion is fixed to the casing, the fixing portion and the front panel supported by the supporting portion are fixed to the casing via the supporting portion. The antireflective portion is formed on the front panel except for the contact portion. Therefore, the fixing portion of the projection panel assembly can be firmly fixed to the front panel because a sufficient adhesion is ensured between the contact portion of the front panel and the fixing portion. This does not cause problems, such as a weak fixing force, and improves the reliability of the projection apparatus. By forming the antireflective portion, the contrast of an image or the like on the screen when illuminated by external light can be improved.

Preferably, the production method further includes the step of forming an antireflective portion on the entire viewing-side surface of the front panel.

Preferably, the antireflective portion is formed of a film coated with an AR solvent.

Further objects, features, and advantages of the present invention will become apparent from the following description of the preferred embodiments with reference to the attached drawings.

BRIEF DESCRIPTION OF THE DRAWINGS

FIG. 1 is a schematic sectional view showing the relationship among a bezel body, a screen, a front panel, and the like.

DESCRIPTION OF THE PREFERRED EMBODIMENTS

Figure 1:
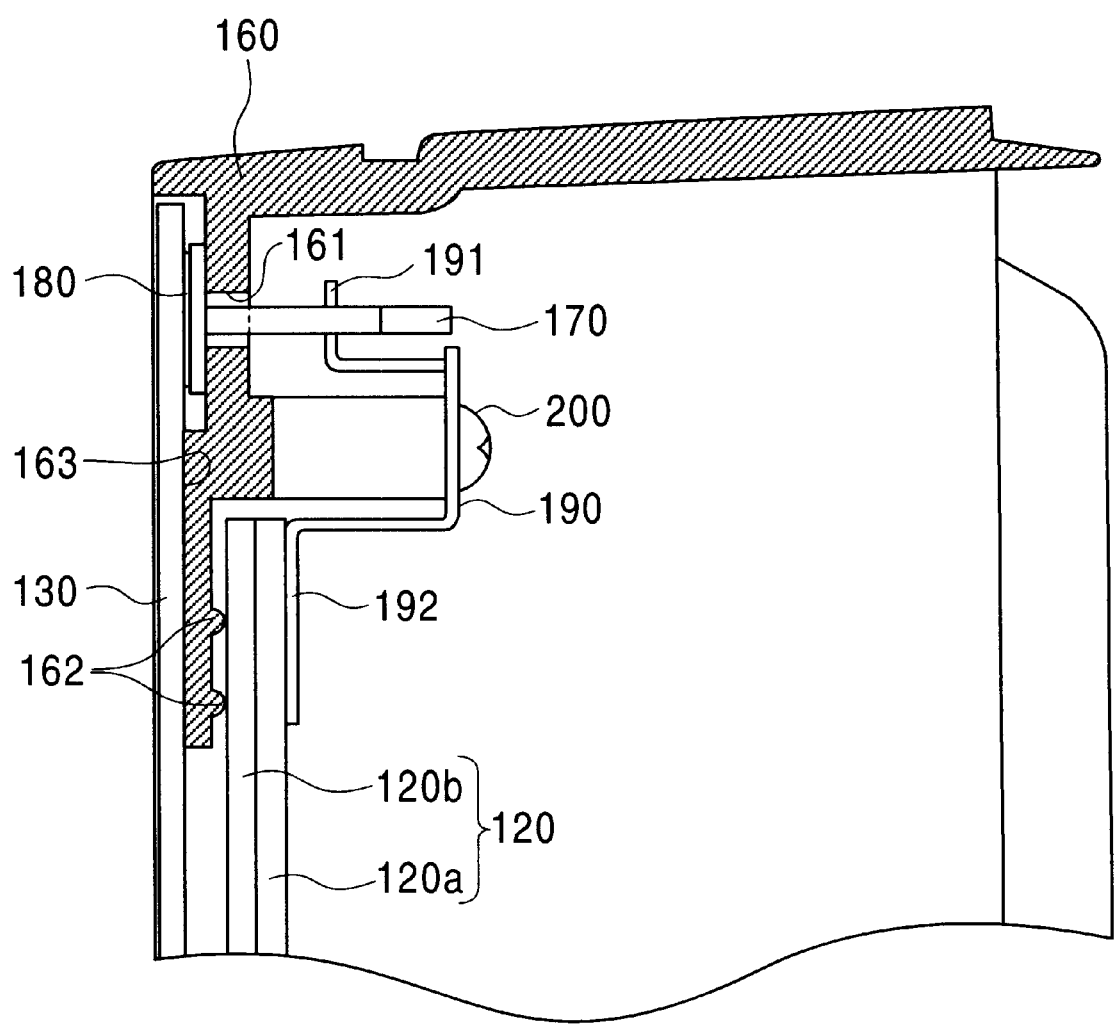

FIG. 1 is a schematic end view showing the relationship among a bezel body 160, a screen 120, a front panel 130, and the like in a projection apparatus 100 according to a first embodiment of the present invention.

The bezel body 160 is L-shaped in cross section, and has holes 161.

Figure 2:
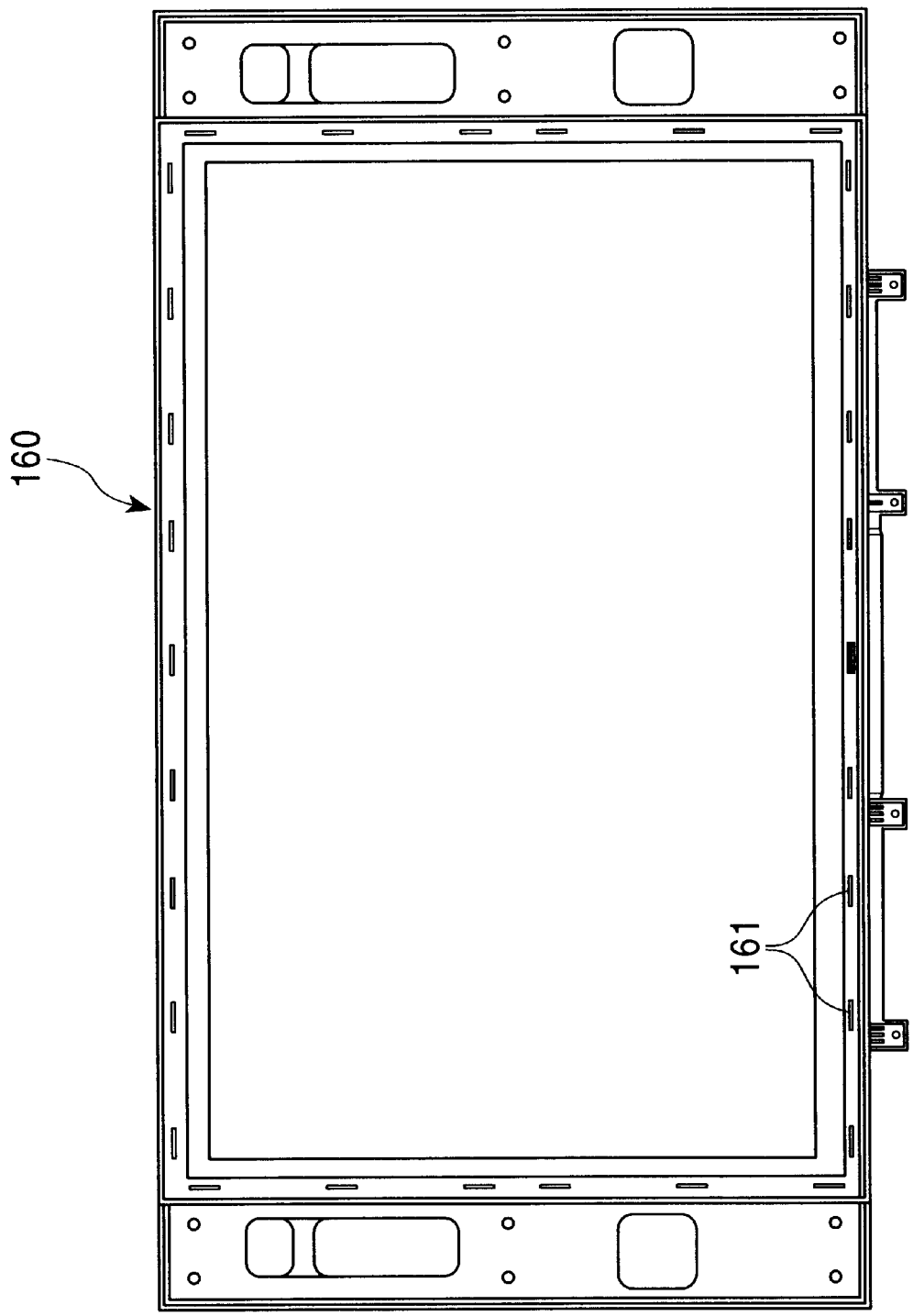
FIG. 2 is a view of holes formed in the bezel body.

The holes 161 are substantially rectangular through holes, as shown in FIG. 2. Six holes 161 are formed on each of the short sides of the bezel body 160, and nine holes 161 are formed on each of the long sides thereof.

In FIG. 1, two projections 162 are formed at the bottom end of the bezel body 160 so as to contact the screen 120. On the side of the bezel body 160 opposite from the projections 162 in contact with the screen 120, a positioning member 163 for positioning the front panel 130 is formed so as to contact with the front panel 130.

The screen 120 in contact with the projections 162 of the bezel body 160 is, more specifically, composed of two screens, a Fresnel screen 120a and a lenticular screen 120b.

In FIG. 1, the Fresnel screen 120a is made of, for example, acrylic, polycarbonate, or a compound of both, and serves to collimate light beams projected from an optical unit 140.

The lenticular screen 120b is similarly made of, for example, acrylic, polycarbonate, or a compound of both, and serves to spread out the projected light beams collimated by the Fresnel screen 120a in the right and left direction.

The front panel 130 is placed on the outer side (left side in FIG. 1) of the screen 120 having such a structure with the bezel body 160 therebetween is called a "contrast screen", and serves to improve the contrast when illuminated by external light and to protect the viewing-side surface of the screen 120.

The front panel 130 is also made of, for example, acrylic, polycarbonate, or a compound of both.

Figure 3:
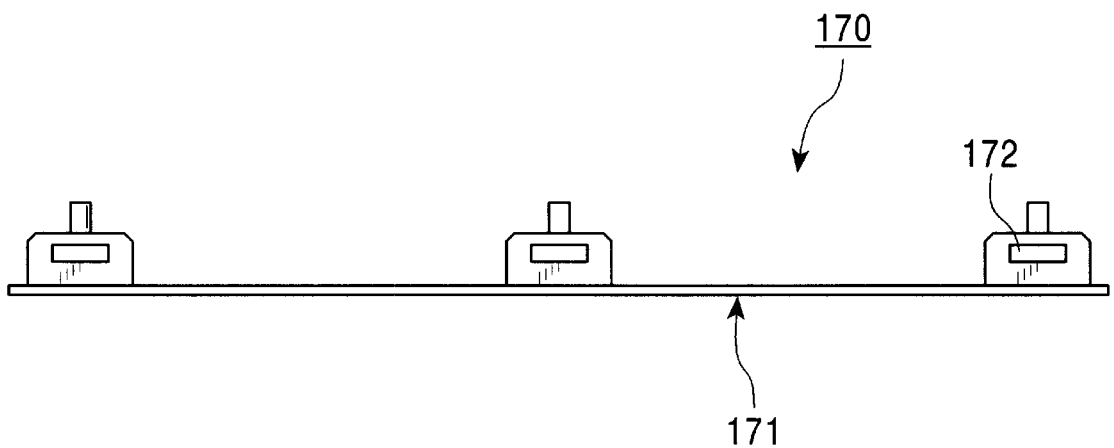
FIG. 3 is a view of a front panel mounting member.

The front panel 130 is fixed onto front panel mounting members 170 serving as the fixing portion with an adhesive tape 180 or an adhesive. The front panel mounting members 170 are shaped as shown in FIGS. 1 and 3. FIG. 3 shows only the front panel mounting member 170 shown in FIG. 1, as viewed from above.

Each of the front panel mounting members 170 has an adhesive tape mounting surface 171. The front panel 130 is fixed on the front panel mounting members 170 with the adhesive tapes 180 placed on the adhesive tape mounting surfaces 171.

Figure 4:
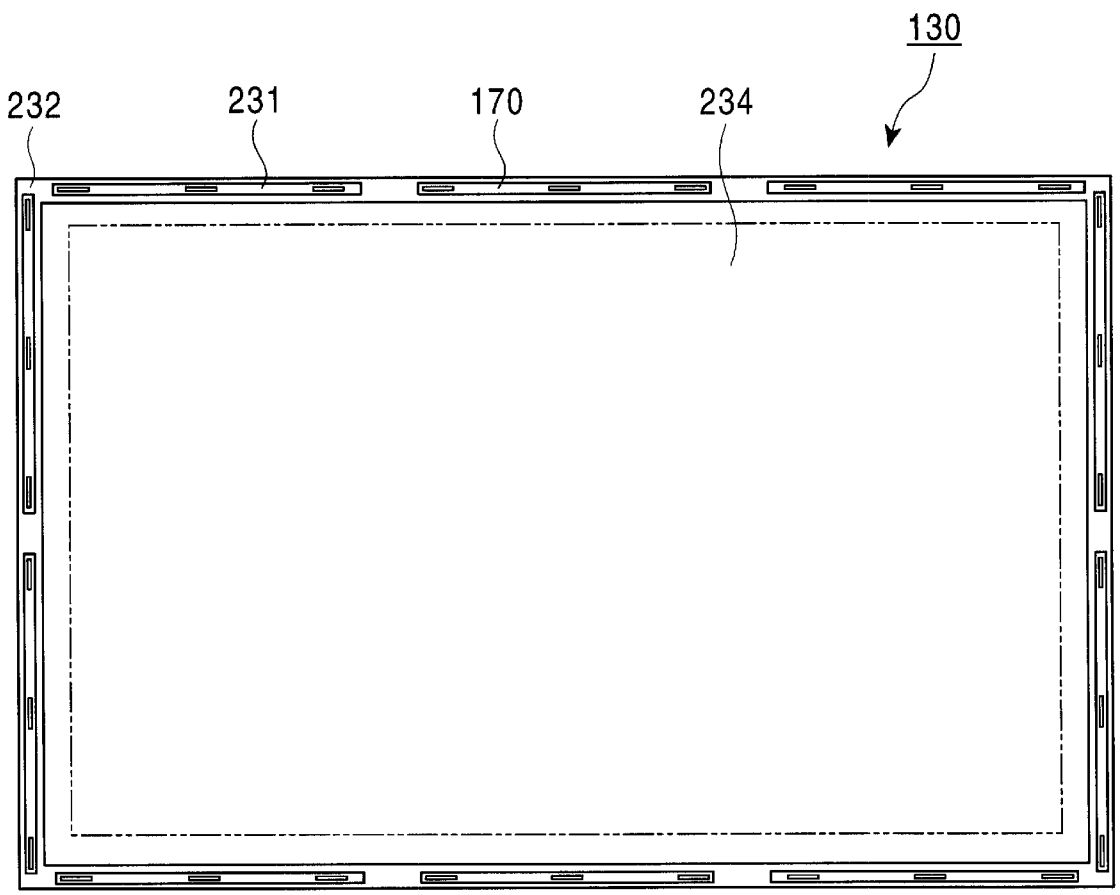
FIG. 4 is a view showing a state in which the front panel mounting members are fixed on the front panel.

FIG. 4 is a general view of the front panel 130 to which the front panel mounting members 170 are fixed with the adhesive tapes 180.

The front panel mounting members 170 have screen fixture engaging holes 172 to be engaged with engaging end portions 191 of screen fixtures 190 serving as the supporting portion, which will be described later.

As shown in FIG. 3, the screen fixture engaging holes 172 are substantially rectangular through holes, and are slightly larger than the engaging end portions 191 of the screen fixtures 190. For this reason, even when the engaging end portions 191 of the screen fixtures 190 are inserted in and engaged with the screen fixture engaging holes 172, they are not fixed firmly, but are fitted therein with some play.

Each of the screen fixtures 190 to be engaged with the screen fixture engaging holes 172 is fixed to the bezel body 160 by fixing screw 200, as shown in FIG. 1. The screen fixture 190 is engaged with the front panel mounting member 170 at the engaging end portion 191 disposed at the upper end thereof. A screen fixing portion 192 is formed at the lower end thereof so as to fixedly press the surface of the Fresnel screen 120a of the screen 120.

In this way, in the projection apparatus 100 of this embodiment, the front panel mounting members 170 are engaged with the screen fixtures 190, and the front panel 130 is fixed on the front panel mounting members 170 with the adhesive tapes 180. The screen 120 is also fixed by the screen fixtures 190. These components constitute a projection panel assembly.

The projection panel assembly and the projection apparatus 100 including the projection panel assembly of this embodiment described above operate as follows.

The optical unit 140 and the like are placed in the projection apparatus 100, the screen 120 is mounted on the bezel body 160, as shown in FIG. 1, and the screen fixtures 190 are fixed by the fixing screws 200 so that they clamp the screen 120.

On the other hand, the front panel mounting members 170 are bonded onto the front panel 130 with the adhesive tapes 180, as shown in FIG. 4. The portions at the screen fixture engaging holes 172 of the front panel mounting members 170 are inserted inward through the holes 161 of the bezel body 160.

Figure 5:
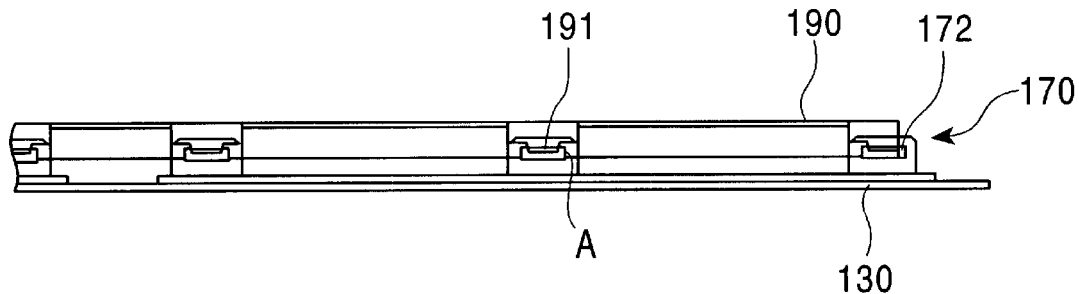
FIG. 5 is a view showing a state in which screen engaging end portions of screen fixtures are inserted in screen fixture engaging holes.

The screen fixture engaging end portions 191 of the screen fixtures 190 are inserted in and engaged with the inserted screen fixture engaging holes 172, as shown in FIG. 5. Even when the screen engaging end portions 191 of the screen fixtures 190 are inserted in the screen fixture engaging holes 172, they are movable because a clearance A is formed therebetween.

In this way, the front panel 130 of this embodiment is not directly bonded to the bezel body 160, but is indirectly mounted on the bezel body 160 with the front panel mounting members 170 and the screen fixtures 190 therebetween. The front panel mounting members 170 attached to the front panel 130 are movable with respect to the holes 161 of the bezel body 160 and the engaging end portions 191 of the screen fixtures 190.

Therefore, even if the front panel 130 principally made of acrylic, polycarbonate, or a compound of both, and the bezel body 160 made of, for example, a polystyrene compound expand or contract at different coefficients due to heat generated by the projection apparatus 100, or changes in outside air temperature or humidity because there is a difference between their materials, the difference in coefficient of expansion or contraction is absorbed by the movable portions.

That is, since the front panel mounting members 170 are movable with respect to the holes 161 of the bezel body 160 and the engaging end portions 191 of the screen fixtures 190, the front panel 130 is prevented by the movement of the front panel mounting members 170 from being distorted and from separating from the bezel body 160.

According to such a projection apparatus 100 of this embodiment, distortion and the like of the front panel 130 and the bezel body 160 due to changes in temperature and humidity are absorbed by the front panel mounting members 170, the screen fixtures 190, and the like, thereby reducing stress to be applied to the bonding surfaces between the front panel mounting members 170 and the front panel 130 and reducing surface strain of the front panel 130. Since the screen fixtures 190 fix both the screen 120 and the front panel mounting members 170, it is possible to reduce the number of components and to thereby reduce the cost.

While both the screen 120 and the front panel mounting members 170 are fixed by the screen fixtures 190 in this embodiment, they may be fixed by separate fixing members.

Figure 6:
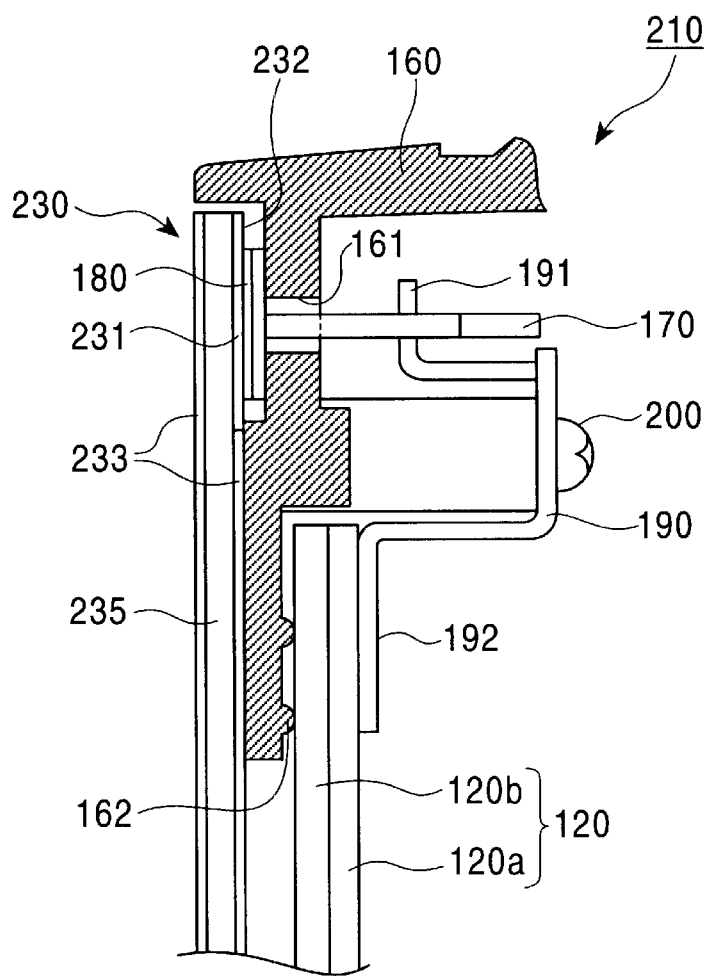
FIG. 6 is a schematic sectional view showing the principal part of a projection apparatus according to a second embodiment of the present invention.

FIG. 6 is a schematic sectional view showing the principal part of a projection apparatus 210 according to a second embodiment of the present invention. Since the configuration of the projection apparatus 210 of this embodiment is substantially similar to that of the projection apparatus 100 of the above-described first embodiment, the differences from the projection apparatus 100 are described below. The components common to those in the first embodiment are denoted by the same numerals, and descriptions thereof are omitted.

Since the projection apparatus 210 of this embodiment is different from the projection apparatus 100 of the first embodiment principally in the structure of a front panel 230, the following description will be given with particular emphasis on the structure of the front panel 230.

Figure 7:
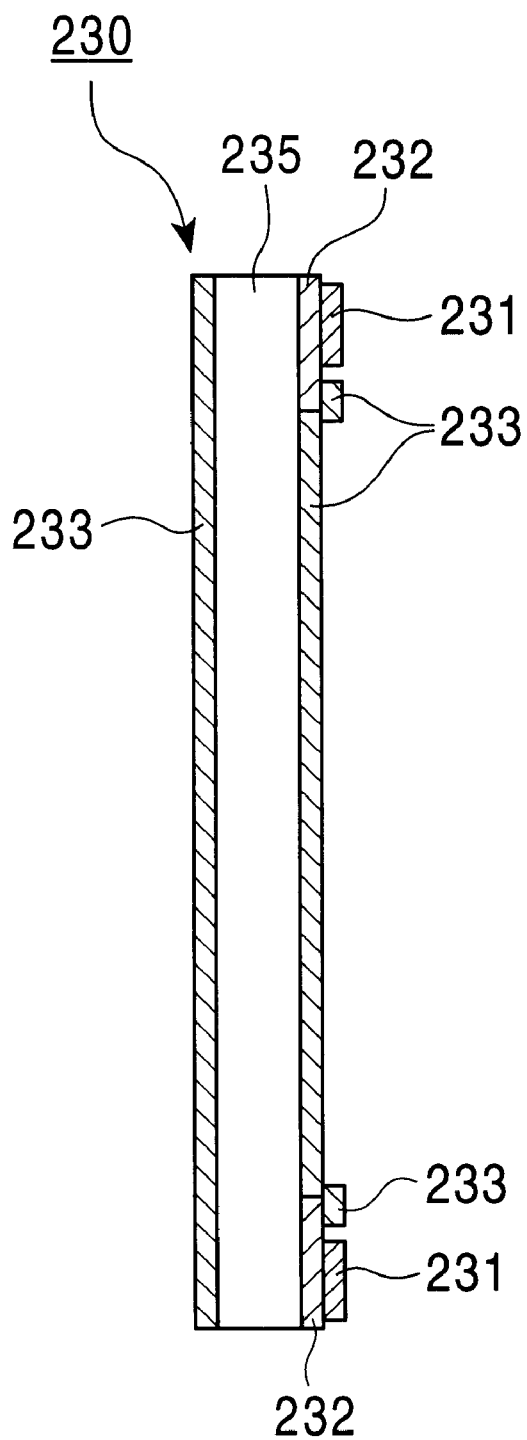
FIG. 7 is a sectional view of a front panel shown in FIG. 6.
Figure 8:
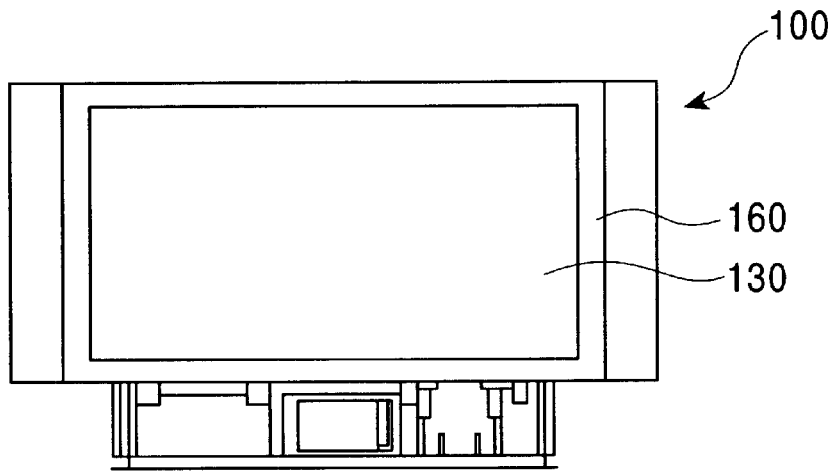
FIG. 8 is a front view of a projection apparatus.
Figure 9:
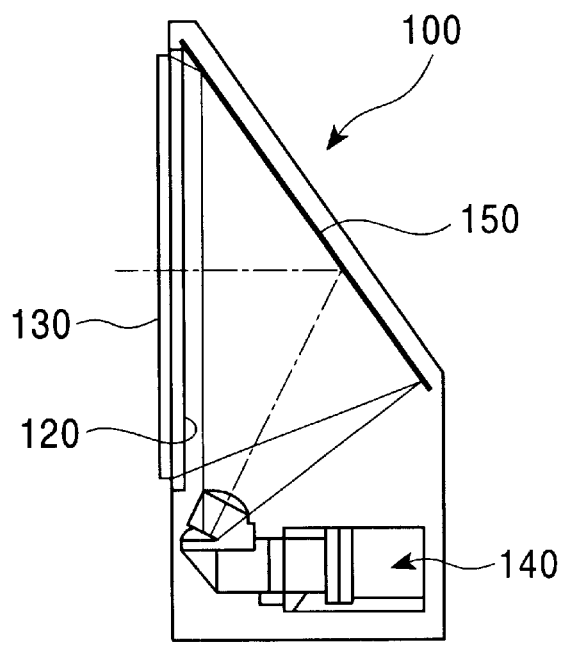
FIG. 9 is a schematic sectional view of the projection apparatus shown in FIG. 8.
Figure 10:
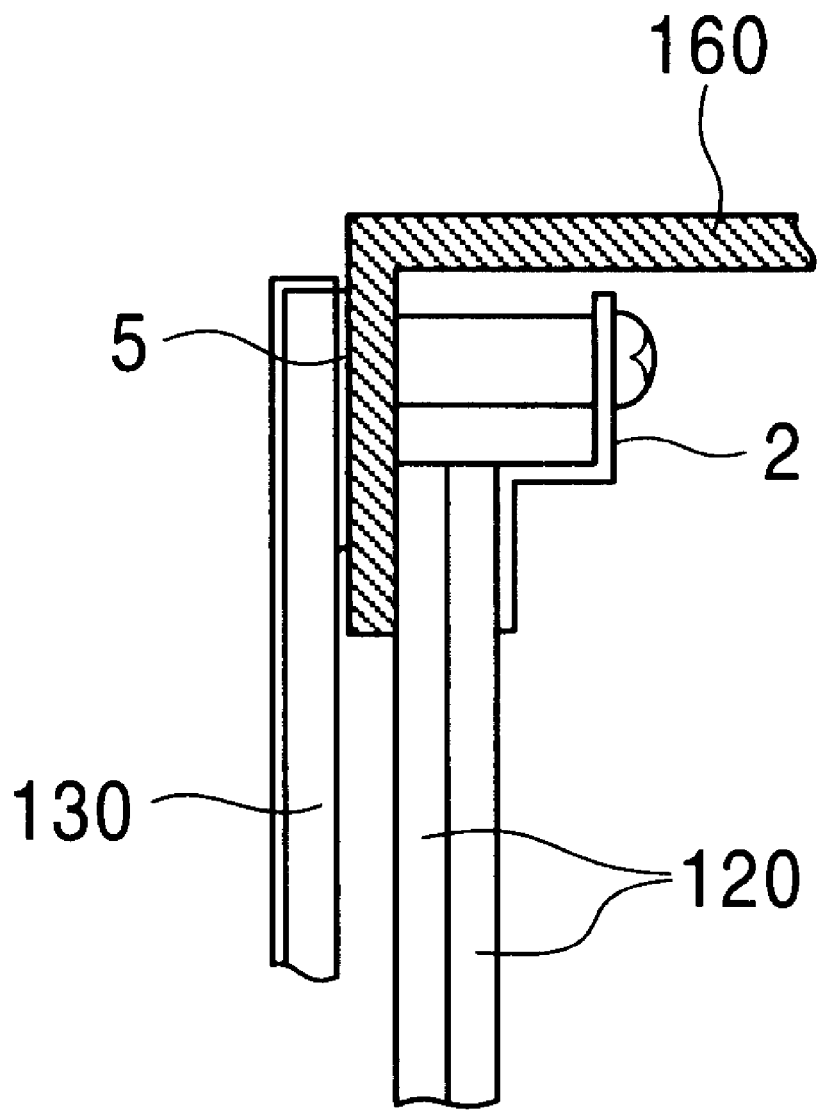
FIG. 10 is a schematic end view showing the relationship between a screen and a front panel in a conventional projection apparatus.

FIG. 6 shows a state in which the front panel 230 is mounted on a bezel body 160 of the projection apparatus 210, and FIG. 7 shows a state in which front panel mounting members 170 are bonded to the front panel 230 with adhesive tapes 180.

The structure of the front panel 230 will be more specifically described with reference to FIGS. 6 and 7. First, the front panel 230 has a front panel base 235 at its center. The front panel base 235 is made of, for example, acrylic or polycarbonate, in a manner similar to that of the front panel 130 of the first embodiment.

As shown in FIG. 4, printed edge portions 232 serving as printed shading portions are formed on the light-source side of the front panel base 234 on the inner side of the projection apparatus 210. More specifically, the printed edge portions 232 are formed at fixed intervals around the entire periphery of the front panel base 235.

In the printed edge portions 232 thus formed, adhesive portions 231 serving as the contact portions are formed. In FIG. 6, the adhesive portions 231 are formed corresponding to the front panel mounting members 170. In FIG. 6, the adhesive portions 231 are formed on the surfaces of the printed edge portions 232, and the adhesive tapes 180 are bonded thereto.

The adhesive tapes 180 are placed on the adhesive portions 231, as shown in FIG. 6, and the front panel mounting members 170 are bonded to the front panel 230.

That is, the front panel mounting members 170 are placed corresponding to the printed edge portions 232, as shown in FIG. 6. Therefore, the printed edge portions 232 serve to prevent the front panel mounting members 170 from being seen from the outside of the front panel 230.

An AR (antireflection) film 233 is bonded on the entire surface of the front panel base 235 except on the printed edge portions 232, as shown in FIG. 7.

Therefore, the AR film 233 completely covers a transparent portion 234 (an area enclosed by a two-dot chain line shown in FIG. 4) of the front panel 230. Images are projected onto the transparent portion 234.

By placing the AR film 233 on the front panel 230, the contrast of an image projected onto the surface of the front panel 230 is prevented from being decreased when illuminated by external light.

An AR film 233 is also placed on the outer side of the front panel base 235, as shown in FIG. 6, so as to cover the entire outer surface of the front panel base 235.

By thus placing the AR films 233 on both sides of the front panel base 235, the contrast of an image projected onto the surface of the front panel 230 can be prevented from being decreased when illuminated when illuminated by external light, and this allows the user to more easily view the image.

A description will be given below of a method for producing the front panel 230 with the above structure.

First, printed edge portions 232 shown in FIG. 7 are printed on the inner surface (light-source side) of the front panel base 235 shown in FIG. 6.

After that, an AR film 233 having the same size as that of the front panel base 235 is bonded onto the entire outer surface of the front panel base 235.

Next, an AR film 233 is bonded onto the inner surface of the front panel base 235, as shown in FIG. 7.

When the AR film 233 is thus bonded onto the inner surface of the front panel base 235, it is not placed in the printed edge portions 232 on the periphery of the front panel center portion, but is placed only in the front panel center portion.

Since the printed edge portions 232 have the adhesive portions 231 to which the front panel mounting members 170 are to be bonded, as described above, the AR film 233 is not placed on the adhesive portions 231.

Conventionally, the front panel is subjected to antireflection coating, for example, in the following procedure in order to prevent the contrast of an image projected onto the surface of the front panel from being decreased when illuminated by external light.

That is, an abrasion-resistant hard-coating solvent is applied onto the entire front and rear surfaces of a screen original formed by extrusion molding, and is soaked in an AR solvent, thereby subjecting the front panel to AR coating.

Then, the above-described edge printing is performed on the AR-coated front panel. Adhesive tapes or the like are placed on the adhesive portions of the printed edge portions, and the front panel is bonded to the main body of the projection apparatus.

Therefore, the area of the front panel on which the adhesive tapes are to be placed is subjected to both AR coating and edge printing. When printing is thus performed on the AR-coated portion, since the adhesion of ink is seriously reduced, the bonding force in the printed portion is insufficient, and fixing to the front panel is unstable. Even when the front panel is first subjected to the above edge printing, and is then subjected to AR coating, since the adhesion of adhesive tapes onto the AR-coated portion is seriously reduced, and this also makes fixing to the front panel unstable.

In this embodiment, however, the printed edge portions 232 are first formed on the front panel 230, and no AR film 233 is form in the area where the adhesive tapes are placed, the adhesion of printing ink will not be decreased, and the bonding force of the adhesive tapes will also not be reduced. For this reason, the front panel 230 and the front panel mounting members 170 can be bonded with a sufficient bonding force.

This vastly improves the reliability of the projection apparatus 210.

The inner-side portion of the front panel base 235 of the front panel 230 where no AR film 233 is formed does not have any influence on the projected images. For this reason, a decrease in contrast of images when illuminated by external light due to the absence of the AR film 233 can be avoided. Furthermore, since printing is not performed on the viewing side, but on the light-source side, a good external appearance can be maintained.

The front panel 230 thus produced is bonded to the front panel mounting members 170 with the adhesive tapes 180, and is fixed to the bezel body 160 of the projection apparatus 210.

The projection apparatus 210 is completed through further predetermined production processes.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A projection panel assembly mounted on a casing holding a screen on which an image is projected and having a front panel mounted on a viewing side of said screen, said projection panel assembly comprising:

a screen fixture fixing said screen to said casing and having an engaging end portion serving as a supporting portion; and a front panel mounting member adhesively fixing said front panel and having a screen fixture engaging hole larger than said engaging end portion that is inserted therein, so as to movably support said front panel mounting member relative to said screen fixture.

2. A projection apparatus comprising:

a screen on which an image is projected;

a casing for holding said screen:

a front panel mounted on said casing and arranged on an outer viewing-side of said screen; and a projection panel assembly for mounting said front panel, wherein said projection panel assembly includes:

a screen fixture fixing said screen to said casing and having an engaging end portion serving as a supporting portion;

a front panel mounting member adhesively fixing said front panel and having a screen fixture engaging hole larger than said engaging end portion that is inserted therein for movably supporting said front panel mounting member relative to said screen fixture.

3. The projection apparatus according to claim 2, wherein said front panel comprises on an inner light-source side thereof a contact portion with which said front panel mounting member of said projection panel assembly is contacted, a front panel center portion adjacent to said contact portion, an antireflective portion formed on the light-source side surface of said front panel except for said contact portion, and a printed edge portion formed to include at least said contact portion of said front panel.

4. The projection apparatus according to claim 3, wherein an antireflective portion is formed on the entire viewing-side surface of said front panel.

5. The projection apparatus according to claim 4, wherein said antireflective portion is formed of a film coated with an antireflection solvent.

6. A production method for producing a projection apparatus having a screen on which an image is projected and having a front panel mounted on an outer viewing side of said screen, said production method comprising the steps of:

forming a contact portion on an inner light-source side and on an edge of said front panel;

forming a printed edge portion including at least said contact portion;

forming an antireflective portion on the light-source side surface of said front panel except for said contact portion;

adhesively fixing to said contact portion of said front panel a front panel mounting member that has a screen fixture engaging hole;

engaging an engaging end portion of a screen fixture in said screen fixture engaging hole that is larger than said engaging end portion;

fixing said said screen to said casing, so that said front panel is movably supported relative to said screen fixture.

7. The production method of a projection apparatus according to claim 6, further comprising the step of:

forming an antireflective portion on the entire viewing-side surface of said front panel.

8. The projection method of a projection apparatus according to claim 7, wherein said antireflective portion is formed of a film coated with an antireflection solvent.

* * * * *